United States Patent
Wilson et al.

(10) Patent No.: US 7,557,287 B2
(45) Date of Patent: Jul. 7, 2009

(54) METHOD OF AND SYSTEM FOR TIMING TRAINING

(75) Inventors: Mark L. Wilson, Dallas, TX (US);
Agustin J. Membreno, Plano, TX (US);
Mohammadreza Nirumandrad, Plano, TX (US)

(73) Assignee: Onboard Research Corporation, Carrollton, TX (US)

( * ) Notice: Subject to any disclaimer, the term of this patent is extended or adjusted under 35 U.S.C. 154(b) by 197 days.

(21) Appl. No.: 11/536,446

(22) Filed: Sep. 28, 2006

(65) Prior Publication Data

US 2007/0089592 A1 Apr. 26, 2007

Related U.S. Application Data

(60) Provisional application No. 60/730,220, filed on Oct. 25, 2005.

(51) Int. Cl.
*G09B 15/00* (2006.01)
(52) U.S. Cl. .......................................................... 84/484
(58) Field of Classification Search ................ 84/477 R, 84/484, 723
See application file for complete search history.

(56) References Cited

U.S. PATENT DOCUMENTS

| | | | |
|---|---|---|---|
| 3,774,494 A | 11/1973 | Reid, Sr. et al. | |
| 4,285,041 A | 8/1981 | Smith | |
| 4,396,904 A | 8/1983 | Hanaoka | |
| 4,919,030 A | 4/1990 | Perron, III | |
| 4,982,642 A | 1/1991 | Nishikawa et al. | |
| 5,036,742 A | 8/1991 | Youakim | |
| 5,183,398 A | 2/1993 | Monte et al. | |
| 5,417,137 A | 5/1995 | Krasny et al. | |
| 5,421,236 A | 6/1995 | Sanger | |
| 5,515,764 A * | 5/1996 | Rosen .......................... | 84/484 |
| 5,850,048 A | 12/1998 | Ruf | |
| 6,114,916 A | 9/2000 | Koyanagi et al. | |
| 6,166,314 A | 12/2000 | Weinstock et al. | |
| 6,175,632 B1 | 1/2001 | Marx | |
| 2005/0211073 A1* | 9/2005 | Kobayashi ................... | 84/612 |
| 2007/0199431 A1* | 8/2007 | Kashioka ..................... | 84/612 |

* cited by examiner

*Primary Examiner*—Jeffrey Donels
(74) *Attorney, Agent, or Firm*—Winstead PC (57) ABSTRACT

A timing-training method includes displaying, via a sweep function, a real-time visual indicator responsive to user input and generating a plurality of sounds synchronized with the sweep function.

57 Claims, 8 Drawing Sheets

| PHRASE | H | VOL | 060 - 000 |
|---|---|---|---|
| HISTORY2 | * | 0% | QUARTER |

| BEAT | NOTE | BEAT | NOTE |
|---|---|---|---|
| 1 »»» | ------ | 5 | ------ |
| 2 | ------ | 6 | ------ |
| 3 | ------ | 7 | ------ |
| 4 | ------ | 8 | ------ |

FIG. 15B

| PHRASE | H | VOL | 060 - 000 |
|---|---|---|---|
| HISTORY2 | * | 0% | QUARTER |

| BEAT | NOTE | BEAT | NOTE |
|---|---|---|---|
| 1 »»» | ------ | 5 | ------ |
| 2 | ------ | 6 | ------ |
| 3 | ------ | 7 | ------ |
| 4 | ------ | 8 | ------ |

FIG. 15C

| PHRASE | H | VOL | 060 - 000 |
|---|---|---|---|
| HISTORY2 | * | 0% | QUARTER |

| BEAT | NOTE | BEAT | NOTE |
|---|---|---|---|
| 1 »»» | QUARTER | 5 | ------ |
| 2 | ------ | 6 | ------ |
| 3 | ------ | 7 | ------ |
| 4 | ------ | 8 | ------ |

*FIG. 15D*

| PHRASE | H | VOL | 060 - 000 |
|---|---|---|---|
| HISTORY2 | * | 0% | QUARTER |

| BEAT | NOTE | BEAT | NOTE |
|---|---|---|---|
| 1 | quarter | 5 | ------ |
| 2 »»» | ------ | 6 | ------ |
| 3 | ------ | 7 | ------ |
| 4 | ------ | 8 | ------ |

| PHRASE | H | VOL | 060 - 000 |
|---|---|---|---|
| HISTORY2 | * | 0% | QUARTER |

| BEAT | NOTE | BEAT | NOTE |
|---|---|---|---|
| 1 »»» | quarter | 5 | 5over1 |
| 2 | 8th | 6 | 16th triplet |
| 3 | 8th triplet | 7 | 7over1 |
| 4 | 16th | 8 | 32nd |

— 206
216

METHOD OF AND SYSTEM FOR TIMING TRAINING

CROSS-REFERENCE TO RELATED APPLICATIONS

This patent application claims priority from, and incorporates by reference the entire disclosure of, U.S. provisional patent application No. 60/730,220, filed on Oct. 25, 2005.

BACKGROUND

Placement of musical notes in time relative to one another is a foundational element of music and is typically referred to as timing and rhythm. Executing groupings of notes with accurate relative timing is vital for musicians to be able to start together and end together without speeding up, slowing down, or otherwise getting separated during the course of a performance. Musicians have, for thousands of years, sought ways to improve their timing and rhythmic skills.

In 1812, Dietrik Winkel found that a double-weighted pendulum (i.e., a pendulum having a weight on each side of a pivot) would swing as slowly as 25 swings per minute, even when the pendulum was made of short length. Johann Nepenuk Maelzel appropriated Winkel's idea and, in 1816, started manufacturing "Maelzel's Metronome", which featured a sliding weight used for pendulum swing-rate adjustment and a mechanism to generate an audible click used as a primary beat. Maelzel's Metronome was widely used as a timing reference device for musicians.

Since Maelzel's design of 1816, metronomes have remained largely unchanged. They continue to be a primary tool used by musicians to improve their timing skills. The standard method of use is to set a click rate and then play along with the metronome while trying to listen for timing differences between clicks generated by the metronome and a sound of one's own instrument's moment of attack. These dual tasks are often difficult to perform. They are: 1) playing the sound on the musical instrument; and 2) listening for and recognizing timing differences between the two sounds by ear while planning for and preparing to play the next sound on the instrument. The difficulty of determining which of the two sounds occurs first is compounded when the two sounds are very close together in time. This complex split-attention skill must be developed if a musician is to improve his or her timing skills using a metronome.

Musicians also must develop dynamic control, which typically means their ability to control the relative loudness and softness of their sounds. However, there is no device available whose purpose is to measure and report the relative dynamic level of the user's sounds to the user.

SUMMARY OF THE INVENTION

A timing-training method includes displaying, via a sweep function, a real-time visual indicator responsive to user input and generating a plurality of sounds synchronized with the sweep function.

A system for timing training includes a display system adapted to display, via a sweep function, a real-time visual indicator responsive to user input, a user input device interoperably connected to the display system, and a metronome device interoperably connected to the display system and synchronized with the sweep function.

A note-phrase setup method includes selecting a first note value of a plurality of available note values playable by a timing-training system and selecting a second note value of the plurality of available note values.

The above summary of the invention is not intended to represent each embodiment or every aspect of the present invention.

BRIEF DESCRIPTION OF THE DRAWINGS

A more complete understanding of the method and system of the present invention may be obtained by reference to the following Detailed Description of Exemplary Embodiments of the Invention when taken in conjunction with the accompanying Drawings wherein.

DETAILED DESCRIPTION OF ILLUSTRATIVE EMBODIMENTS OF THE INVENTION

A system in accordance with principles of the invention enables a user to execute groupings of sounds (e.g., musical notes) and to visually determine changes occurring in dynamic level as well as where in time the sounds occurred relative to each other and relative to an audible reference click sound. The system may be used for purposes of skills improvement and assessment. After setting a desired rhythm, a user may start rhythm playback and begin playing an instrument. The user's notes are detected and a real-time visual representation is created of the timing and dynamic data of sounds generated by the instrument being played.

In various embodiments of the invention, an electronic device divides a primary metronome beat into multiple time sub-windows. A musical rhythm may be programmed into the electronic device, which generates a series of click sounds and visual indicators (e.g., flashing lights) relating to the programmed rhythm, which visual indicators may be used as a timing reference. In various embodiments, the electronic device may perform at least one of the following: 1) accept input from a user; 2) detect timing and dynamic data of sounds generated by an instrument being played by the user; 3) record the timing and dynamic data for a historical review by the user; and 4) graphically plot (e.g., in real time) reference click sounds and relative timing and dynamic level of the sounds generated by the played instrument. The user is enabled to see where in time their sounds occur relative to the audible clicks and to assess their technical precision and strengths and weaknesses in order to improve their timing, rhythmic, and dynamic skills.

In various embodiments, a score for timing and rhythmic accuracy of a user's musical performance may be calculated. A period between the audible reference clicks is divided into smaller time windows. When the user makes a sound, the sound is detected and a determination is made regarding in which time window the sound occurred. If the sound occurred in the same time window as the reference click, the sound is counted as being correctly placed in time. If, however, the sound does not occur in the same time window as the reference click, the sound is counted as being incorrectly placed in time. In this way, a score may be calculated for accuracy of performance, providing objective feedback for evaluating performance improvements and a standardized way to compare performances of different rhythmic patterns. The score may be updated, for example, periodically, or with every sound the user makes. A correctness tolerance may be increased to span multiple time windows, thereby enabling a user to make a better score without changing the actual timing of their sounds.

In various embodiments of the invention, software controls the operation of the electronic device. In a typical embodiment, the software operates to coordinate different functions of the device, control a task coordinator, control metronome sound generation, and control a display (e.g., sweep display function akin to a radar screen, in which a blip is displayed if something is detected). The software also typically monitors a user input device, detects user inputs, and controls a display to turn on a pixel in a current display column responsive to detection of a user input.

In a typical embodiment, only one external input is provided to the device, which could be, for example, triggered by a strike by a drumstick. In some prior devices, an analyzer requires timing knowledge of at least two input signals. For example, in some prior devices, a time period between receiving a reference signal and a user input signal is calculated by the analyzer. In contrast to these prior devices, in a typical embodiment of the invention, an analyzer only has timing knowledge of the user input signal and system logic instructs a task coordinator to send an instruction to a metronome to generate a click; however, the analyzer does not receive timing information from the metronome or from system logic about the instructions or the resulting metronome clicks. In various embodiments of the invention, real-time user input data is displayed, in, for example, graphical form. For example, a sweep may occur from left to right and a pixel marker turned on and a pixel placed onto one of a dot matrix's columns responsive to receipt of a user's input (e.g., a drumstick strike).

In some prior devices, a device must wait for both a user input and a reference input to be detected before lighting a display. In the event the user input signal occurs before the reference input signal, display must be delayed until the reference signal is detected. In contrast, in various embodiments of the invention, display occurs responsive to detection of the user input, as there is no need in these embodiments to delay the display timing of user input because no comparison is necessary before timing data is displayed.

In some prior devices, the two inputs are time-stamped for later calculation of a timing difference. In contrast, in various embodiments of the invention, an internal metronome does not generate a time stamp; therefore, it is not necessary for the analyzer of these various embodiments to know, or keep track of, when the metronome generates its clicks, the rate of clicks, or when the system logic issues a click command to the metronome.

Figure 1:
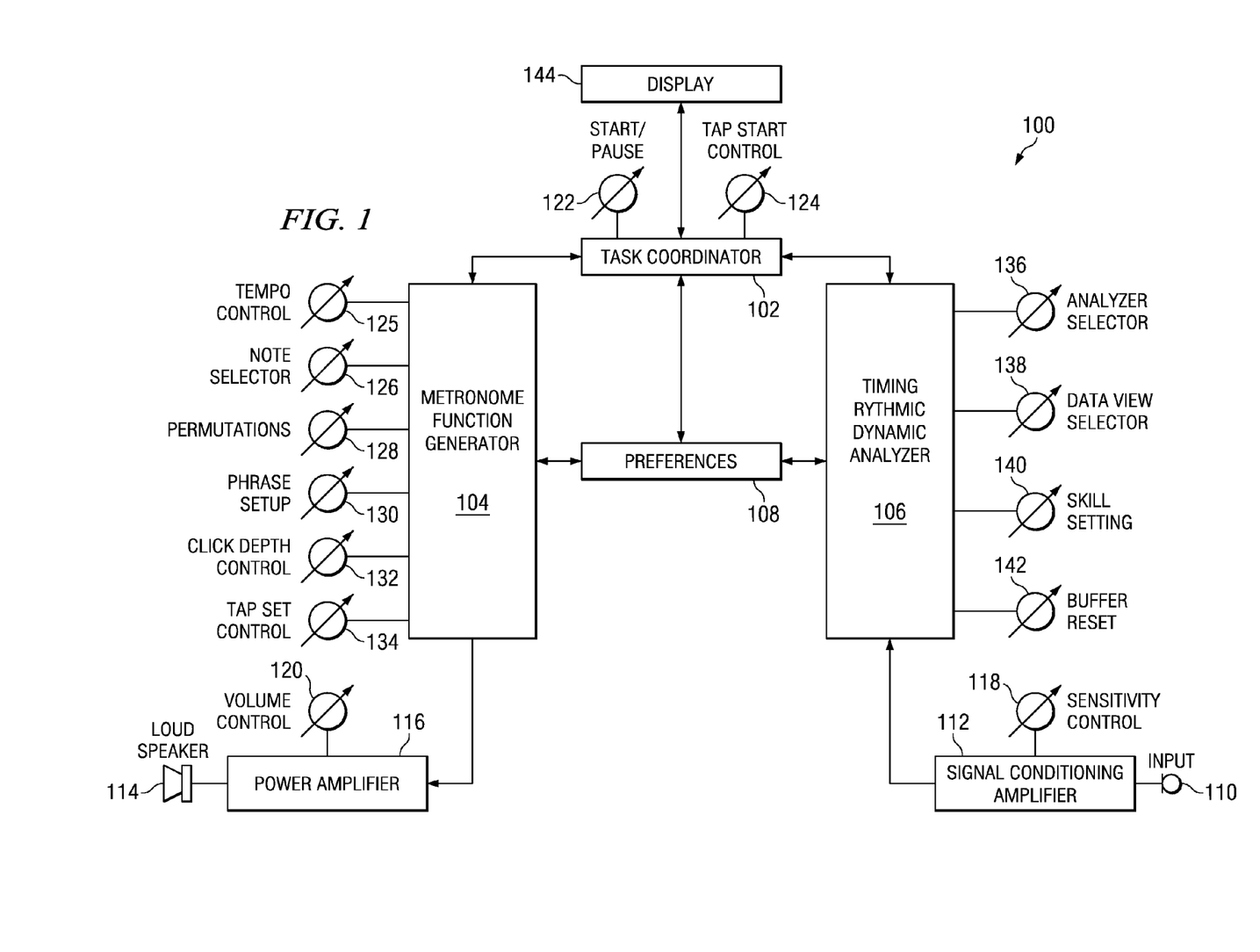
FIG. 1 is a functional block diagram of a timing-training system.

Referring now to the FIGURES, FIG. 1 is a functional block diagram of a timing-training system in accordance with principles of the invention. In FIG. 1, a timing-training system 100 includes a task coordinator block 102, a metronome function generator 104, a timing rhythmic dynamic analyzer 106, a preferences block 108, and a display 144. The preferences block 108 permits various user options to be input to the task coordinator block 102, the metronome function generator 104, and the timing rhythmic dynamic analyzer 106.

The timing-training system 100 also includes an input 110 to the timing rhythmic dynamic analyzer 106 via a signal conditioning amplifier 112 and a loudspeaker 114 interoperably connected to the metronome function generator 104 via a power amplifier 116. The signal conditioning amplifier 112 has a sensitivity control 118, while the power amplifier 116 has a volume control 120.

The task coordinator block 102 has a start/pause control 122 and a tap start control 124. The metronome function generator 104 has a tempo control 125, a note selector control 126, a permutations control 128, a phrase setup control 130, a click depth control 132, and a tap set control 134. The timing rhythmic dynamic analyzer 106 has an analyzer selector control 136, a data view selector control 138, a skill setting control 140, and a buffer reset control 142.

As will be apparent to those having skill in the art, the timing rhythmic dynamic analyzer 106 receives inputs from the input 110, the preferences block 108, and the task coordinator block 102. In similar fashion, the metronome function generator 104 receives inputs from the task coordinator block 102 and the preferences block 108. The metronome function generator 104 does not receive inputs from the input 110.

Figure 2:
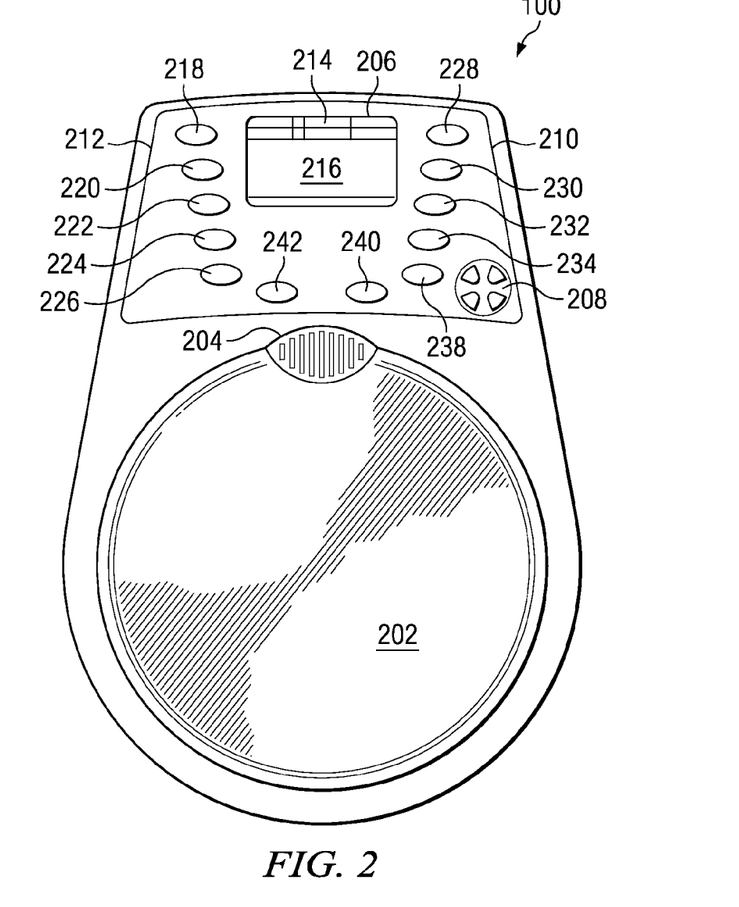
FIG. 2 is a plan view of a timing-training system.

FIG. 2 is a plan view of the timing-training system 100. In FIG. 2, the timing-training system 100 includes a drum pad 202, a speaker 204, a display 206, a selector 208, a metronome panel 210, and a settings panel 212. The display 206 includes a current settings display 214 and a data display 216. The drum pad may be formed of any of a number of materials, 110-2 methyl-vinyl silicone rubber with the following characteristics having been found to be suitable: 1) tensile breaking strength (MPa)—5.4; 2) permanent distortion (%)—3.2-4.0; 3) hardness—40HA; 4) anti-broken elongation rate (%)>340; and 5) brittleness temperature —<−50° C.

Figure 3:
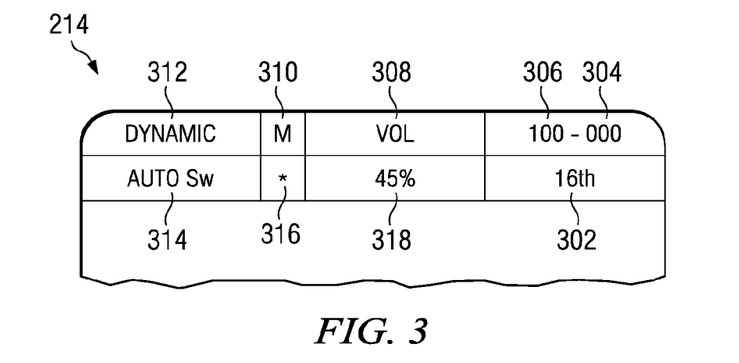
FIG. 3 is a detailed view of the current settings display of the timing-training system shown in FIG. 2.

FIG. 3 is a detailed view of a typical embodiment of the current settings display of the timing-training system 100. The current settings display 214 shows various current settings of the timing-training system 100, including selected accuracy-analyzer, view, skill-level, volume and tempo settings, and measured tempo and performance score that may, in various embodiments of the invention, adjust as the user uses the timing-training system 100. As shown in FIG. 3, the current settings display 214 illustrates a 16th note 302, a measured tempo 304 of 000, a set tempo 306 of 100, a volume level 308, a skill level indicator 310 of M (indicating medium skill level), an accuracy analyzer 312 of Dynamic Analyzer, a view 314 of Auto Sw, and a Beat Number (Phrase Mode) 316.

Returning to FIG. 2, the data display 216 is, in a typical embodiment, a 48×128 pixel display. In this typical embodiment, each time the user strikes the drum pad 202, the timing-training system 100 may be adapted to detect when the strike of the drum pad 202 occurred and represent the strike as one or more pixels on the data display 216. As will be described in more detail below, the user can, in various embodiments of the invention, use viewer options to illustrate the user's timing and rhythmic accuracy in a variety of ways in order to permit the user to better understand the user's performance strengths and weaknesses.

The settings panel 212 includes an analyzers control 218, a views control 220, a skill control 222, a preferences control 224, a reset control 226, and a start/pause control 242. The analyzers control 218 permits the user to select from a plurality of different accuracy analyzers. In a typical embodiment, the accuracy analyzers selectable by the user are Groove Analyzer, Dynamic Analyzer, Subdivision Analyzer, Tracking, and Phrase, each of which are discussed in further detail below. The views control 220 permits the user to select from a plurality of different views of the user's timing performance. In a typical embodiment, the views selected by the user include real-time, History1, History2, and Auto-Switch, each of which is discussed in further detail below. The skill control 222 permits the user to select a skill level for the practice session. In a typical embodiment, the skill levels selectable by the user include low, medium, high, and expert, each of which is discussed in further detail below.

The preferences control 224 permits the user to set various operational preferences. In a typical embodiment, the operational preferences include current setup (save), click subdivisions, vertical grid, Dynamic Analyzer buzzer, Auto-Switch History, and Restore Defaults, each of which is discussed in further detail below. The reset control 226 permits the user to erase all practice session scores and stroke history from memory of the timing-training system 100. The start/pause control 242 permits the user to start or pause the current practice session.

The metronome panel 210 includes a tempo control 228, a note/beat control 230, a permutations control 232, a phrase setup control 234, a volume/sensitivity control 238, and a click/tap control 240. The tempo control 228 permits the user to change a metronome tempo of the timing-training system 100. The note/beat control 230 permits the user to set the note (e.g., 8th or 16th) the user intends to play while in Groove Analyzer, Dynamic Analyzer, or Subdivision Analyzer. When the timing-training system 100 is paused in phrase analyzer, the note/beat control 230 permits the user to select among beat numbers (e.g., 1-8) for purposes of a stroke/history review or permutations setup.

The permutations control 232 permits the user to replace subdivided notes with rests to create a variety of rhythmic variations (i.e., permutations) of a main beat. The phrase setup control 234 permits the user to set up a rhythmic phrase for longer, more complex, rhythmic patterns. The volume/sensitivity control permits the user to adjust metronome-click volume (volume control clock) or dynamic level of the drum pad 202 (sensitivity control). The click/tap control 240 permits the user to adjust the depth or frequency of subdivided metronome clicks (click control) or set metronome tempo by striking the drum pad (tap set control) or tap a counter off and automatically start a practice session on the fly at a detected tempo (tap start control).

The selector 208 permits the user to select settings for a currently-active function. The user may use the selector 208 to scroll between options or values by turning the selector 208 clockwise or counterclockwise. Resulting changes to options or values appear in the current settings display 214 (or in the data display 216 during preferences setup, phrase setup, and tap start).

In a typical embodiment, the selector 208 is speed-sensitive so that the user can advance through various options more quickly by turning the selector 208 more quickly. In various embodiments, the selector 208 also has a push-button function. For example, in phrase setup, tap start, permutations, and preferences, the selector 208 push button may be used to make changes to current settings.

Figure 4A:
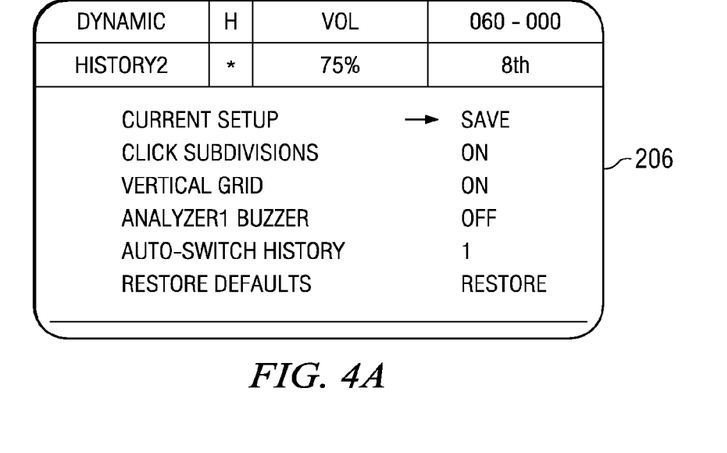
FIG. 4A is a diagram that illustrates the display of the system of FIG. 2 during preferences setup.

FIG. 4A is a diagram that illustrates the display 206 of the timing-training system 100 during preferences setup. A user may view the preferences display and enter into preferences setup by pressing the preferences control 224. Preferences setup permits the user to preset various operational parameters. Current setup (save) permits the user to save the current setup as a default startup setting the next time the timing-training system 100 is powered up. Click subdivisions (On or Off) causes the timing-training system 100 to click all subdivisions in additional to the fundamental quarter note beat when On is selected. For example, if the selected note is set to 16th, the timing-training system 100 clicks each 16th note in addition to the quarter note beat. When Off is selected, the timing-training system 100 suppresses the subdivisions and clicks only the quarter note beat.

With Vertical Grid (On or Off), in real-time view, the timing-training system 100 indicates the dynamic level of the stroke to the drum pad 202 in the form of a horizontal dotted line attached to a vertical stroke indicator and a vertical grid along the right side of the data display 216. When the stroke is harder, the horizontal line appears higher on the data display 216. When the stroke is softer, the horizontal line appears lower on the data display 216. The vertical comparison scale on the right side of the data display 216 shows a relative relationship between strokes. The Groove Buzzer (On or Off) permits an Groove Buzzer to be turned on or off. The Auto-Switch History (1 or 2) permits the user to select which history view appears when the user employs an Auto-Switch function. A Restore Defaults (restore) permits the user to restore all settings to factory defaults.

Figure 4B:
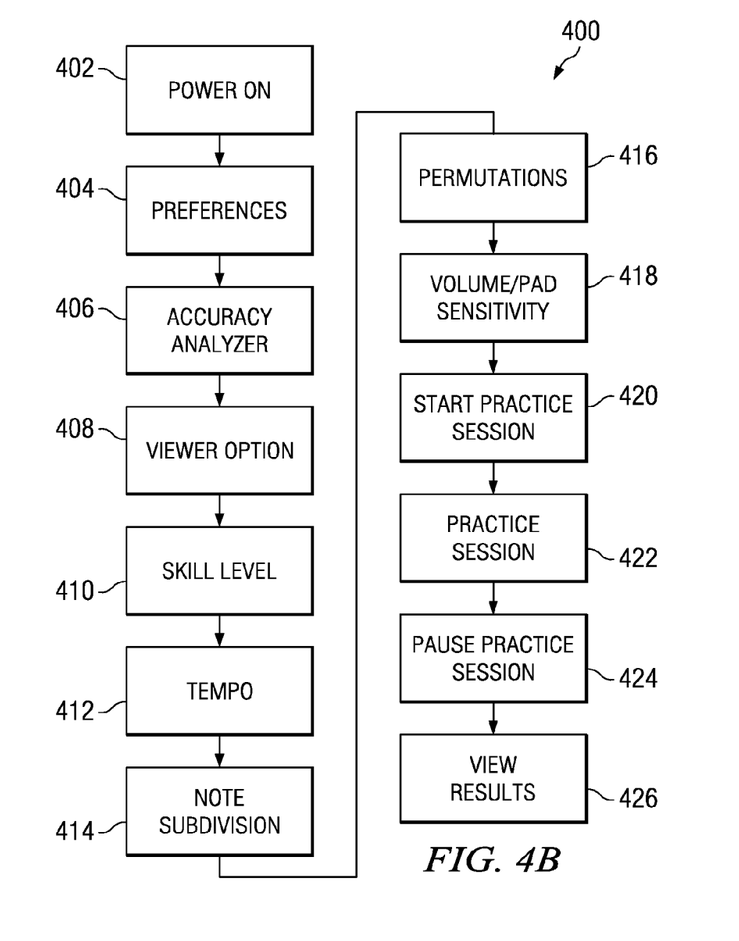
FIG. 4B is a flow diagram illustrating steps of a typical practice session.

FIG. 4B is a flow diagram illustrating steps of a typical practice session using the timing-training system 100. In FIG. 4B, a flow 400 begins at step 402, at which step the timing-training system 100 is powered up. From step 402, execution proceeds to step 404, at which step user preferences are set. From 404, execution proceeds to step 406, at which step a desired accuracy analyzer is selected by the user. From step 406, execution proceeds to step 408. At step 408, a desired viewer option is selected by the user. From step 408, execution proceeds to step 410, at which step a desired skill level is selected by the user. From step 410, execution proceeds to step 412, at which step a desired tempo is selected by the user.

From step 412, execution proceeds to step 414, at which step the user sets a desired note subdivision (e.g., 8th or 16th). From step 414, execution proceeds to step 416, at which step any desired permutations are set by the user. From step 416, execution proceeds to step 418, at which step the user sets desired volume and pad sensitivity. From step 418, execution proceeds to step 420, at which step the user starts a practice session. From step 420, execution proceeds to step 422, at which step the user continues the practice session. From step 422, execution proceeds to step 424, at which step the user may pause the practice session. From step 424, execution proceeds to step 426, at which step the user may view results of the practice session. In another option, the user may view ongoing real-time results of the practice session during step 422 without pausing the practice session.

Those having skill in the art will appreciate that not all of the steps depicted in the flow 400 need be performed in each practice session. Moreover, various steps depicted in the flow 400 may be performed in different orders than those depicted. The flow 400 merely illustrates a typical series of steps performed in setting up and executing a practice session using the timing-training system 100.

Figure 5:
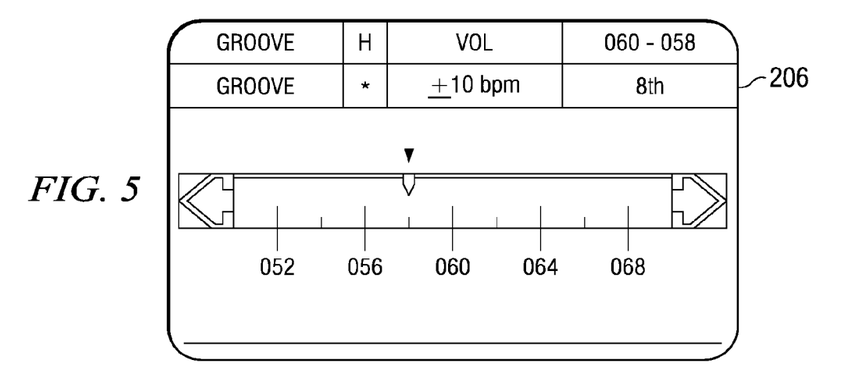
FIG. 5 is a diagram that illustrates the display of the system of FIG. 2 when the system is in Groove Analyzer.

FIG. 5 is a diagram that illustrates the display 206 of the timing-training system 100 when the timing-training system 100 is in Groove Analyzer. The display 206 illustrates the Groove Analyzer, which may be used to assist the user in improving general steadiness of the user's timekeeping. Rather than measuring the accuracy of the user's notes in relation to a metronome click, the Groove Analyzer allows the user to play consistently before or after the metronome clicks (e.g., early or late relative to the click). The user can achieve a high score as long as the user maintains a relatively steady rhythm relative to the metronome clicks.

As illustrated in FIG. 5, the Groove Analyzer features a displayed tempo range in a horizontal orientation with a set tempo displayed in the center and a moving arrow that shows the measured tempo as the practice session progresses. If the measured tempo remains within pre-defined limits of the displayed tempo range, the timing-training system 100 remains silent. However, if the user's measured tempo falls below the displayed tempo range (i.e., drags), the timing-training system 100 sounds a low-tone beep. On the other hand, if the user's measured tempo exceeds the tempo range (i.e., rushes), the timing-training system 100 sounds a high-tone beep. The user can adjust the displayed tempo range shown in FIG. 5 by changing the skill level using the skill control 222.

Figure 6:
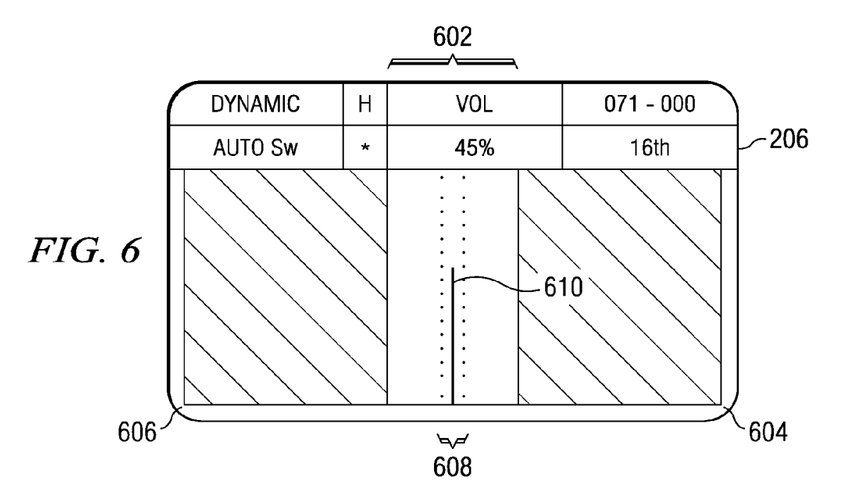
FIG. 6 is a diagram that illustrates the display of the system of FIG. 2 when the system is in Dynamic Analyzer.

FIG. 6 is a diagram that illustrates the display 206 of the timing-training system 100 when the timing-training system 100 is in Dynamic Analyzer. The Dynamic Analyzer may be used to help the user improve the general evenness of dynamic level (i.e., loudness between left and right hands, as well as to help the user to improve the timing of drum strikes with respect to subdivided metronome clicks). The Dynamic Analyzer provides to the user a central data area 602 bounded by shaded areas 604, 606 on either side thereof. A user-selected note determines the width of the central data area 602. For example, a higher subdivision narrows the central data area 602.

In the Dynamic Analyzer, a dotted-lined vertical click marker 608 appears in the central data area 602. The click marker 608 represents timing of the metronome clicks. Strokes that occur during the practice session appear relative to the click marker 608 to provide to the user an at-a-glance indication regarding when the strokes occurred relative to the metronome clicks. A score may be computed based upon timing precision of each stroke relative to the metronome setting and adjusted according to a user-selected skill level. A stroke indicator 610 is shown in the central data area 602, the stroke indicator 610 being shown also within boundaries of the click marker 608, thus indicating that the user's stroke is within a tolerance region of the click marker 608 indicated by the pair of vertical dotted lines representing a user-selected skill level. As will be appreciated by those having skill in the art, in the embodiment shown, if the user were to perform a strike too early, the stroke indicator 610 would be outside of the click marker 608 on the left side of the click marker 608 and, similarly, if the user were to perform a drum strike too late relative to the timing of a metronome click corresponding to the click marker 608, the stroke indicator 610 would be outside of the click marker 608 and on the right side of the click marker 608.

As indicated above, the timing-training system 100 may be used to adjust to the user's skill level to allow a wider or narrower margin of tolerance (i.e., tolerance region) for timing accuracy. In a typical embodiment, the user may select from the following levels: 1 (low); 2 (medium); 3 (high); and 4 (expert). The timing-training system 100 typically calculates a margin of tolerance in 512th notes. For example, in a typical embodiment, the expert level allows a margin of a single 512th note to determine a "perfect" stroke. In other words, to obtain a perfect score of 100% at the expert level, the user's stroke must be within one 512th note of the actual beat. Those having skill in the art will appreciate that other margins of tolerance (e.g., 256th or 1024th) may be used without departing from principles of the invention. Most professional-level drummers can stay with a 512th-note margin of tolerance consistently.

The timing rhythmic dynamic analyzer 106 of the timing-training system 100 receives inputs from the user in the form of strikes to the drum pad 202 via the input 110. Each time such an input is detected, the timing rhythmic dynamic analyzer 106 causes the stroke indicator 610 to appear on the display 206 at a position determined via a display sweep function. As far as the user is concerned, the stroke indicator 610 appears in real time once the user strikes the drum pad 202. As the user continues a practice session, the display sweep function continues to sweep the data display 216. In the embodiment shown in FIG. 6, the sweep function proceeds from left to right in repetitive fashion throughout the practice session, although those having skill in the art will appreciate that the direction of procession in a design choice.

Figure 7:
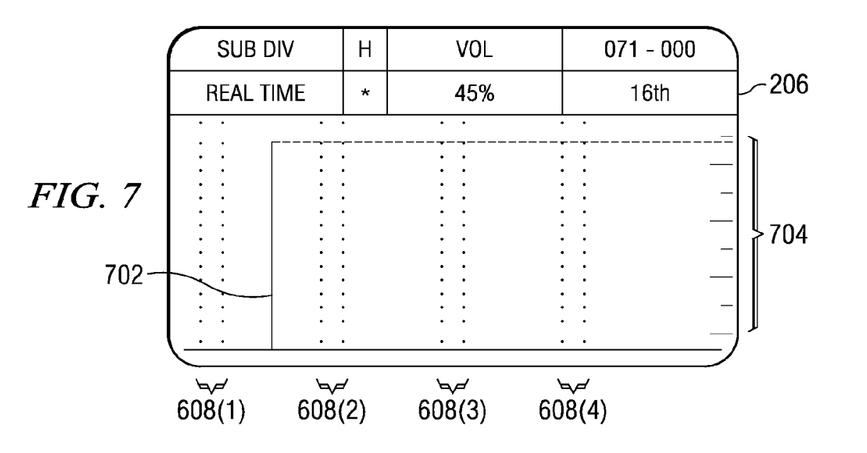
FIG. 7 is a diagram that illustrates the display of the system of FIG. 2 when the system is in Subdivision Analyzer.

FIG. 7 is a diagram that illustrates a real-time result view of the display 206 of the timing-training system 100 when the timing-training system 100 is in Subdivision Analyzer. The Subdivision Analyzer may be used to help the user improve the timing of each subdivision within a fundamental quarter note beat. Unlike the Dynamic Analyzer, which shows a single vertical click marker representing a played note, in the Subdivision Analyzer, a separate vertical click marker for each subdivision of the beat is shown. In the embodiment shown, a total width of the data display 216 represents one complete quarter note beat. Each of the 128 pixel columns represents one 512th note. A score may be generated based upon timing precision of each note in relation to the metronome clicks as adjusted according to a user-selected skill level.

Click markers 608(1)-(4) are used to permit the user to be able to determine how close he or she is to striking the drum pad 202 in time with the metronome clicks. The metronome function generator 104 does not receive information regarding the strikes of the drum pad 202 by the user. Rather, the task coordinator block 102 synchronizes the position of each of the click markers 608(1)-(4) with the metronome clicks generated by the metronome function generator 104 so that, if the user strikes the drum pad 202 at the same time as a corresponding metronome click generated by the metronome function generator 104, a stroke indicator 702 appears within a corresponding click marker 608. The combination of the click markers 608(1)-(4) and the synchronization of the display sweep function and the metronome clicks allows the user to strike the drum pad 202 and immediately assess visually how close he or she is to striking the drum pad 202 at the same time as the metronome clicks generated by the metronome function generator 104.

The real-time view shown in FIG. 7 displays the single touch-sensitive vertical stroke indicator 702 each time the user strikes the drum pad 202. In the real-time view, the timing-training system 100 records the history of drum pad strikes, but displays the stroke indicator 702, for example, for only the most recent stroke or the most recently-completed quarter-note beat, thereby allowing a user to concentrate on each stroke as it is made.

The height of the stroke indicator 702 represents the dynamic level (e.g., loudness) of the stroke, making the stroke indicator 702 appear longer for harder strokes and shorter for softer strokes. The user may optionally turn on a vertical grid 704 in preferences for an extra indicator of the dynamic level of each stroke as it is made. Each time the user strikes the drum pad, the stroke indicator 702 appears before, after, or directly on a click marker corresponding to a metronome click, thereby showing the user where the stroke occurred in time relative to the corresponding metronome click.

As shown in FIG. 7, the display 206 shows the four click markers 608(1)-(4), each of the click markers 608(1)-(4) being synchronized to a metronome click so that, if the user is striking the drum pad 202 in proper timing with the metronome clicks (e.g., within a user-selected skill-level tolerance level), the stroke indicator 702 would successively appear on the display 206 within the click marker 608(1), the click marker 608(2), the click marker 608(3), and the click marker 608(4). Of course, each time the stroke indicator 702 appears on the display 206, the height of the stroke indicator 702 represents the dynamic level of the stroke in question.

In addition, a Tracking Analyzer (not explicitly shown) may be used to assist the user in improving transitions between changing notes while maintaining consistent rhythm and correct timing. The user can switch between quarter notes, 8th notes, 8th-note triplets, 16th note, five over one, 16th-note triples, seven over one, 32nd notes, and 32nd note triplets. In a typical embodiment, the metronome clicks only quarter notes when in the Tracking Analyzer, regardless of preferences for click or click/tap control settings.

The Tracking Analyzer counts the number of strokes the user plays within each quarter-note beat and changes the note setting and vertical click markers accordingly. If the user inadvertently leaves out one or more subdivisions for the intended note grouping within a single beat, the timing-training system 100 may adjust the note based upon the number of actual strokes that occurred. For example, if the user intended to play four 16th notes over a beat, but instead played only three, the timing-training system 100 typically adjusts the note to 8th note triplets. When the timing-training system 100 is paused after a tracking analyzer practice session, the user may press the note/beat control 230 and turn the selector 208 to step through a historical analysis of each note played during the practice session.

In a Phrase Analyzer, the user is assisted in improving the accuracy of more extended, and potentially very-complicated, phrases. The Phrase Analyzer allows the user to set up a rhythmic phrase of any combination of notes (e.g., up to 8 quarter-note beats in duration). When the user starts a practice session, the timing-training system 100 continuously repeats the phrase, measuring and recording the history of every stroke made by the user. During the practice session, the current settings display 214 shows the number of the current beat within the phrase during playback. For all other analyzers, an asterisk appears in this area of the display. When paused, the user can turn the selector 208 to scroll through each beat within the phrase and examine the timing accuracy of each individual beat in the phrase, which permits the user to view how accurate the user was for each stroke in each note of the phrase, thereby identifying weaknesses in specific parts of a longer phrase.

Figure 15A:
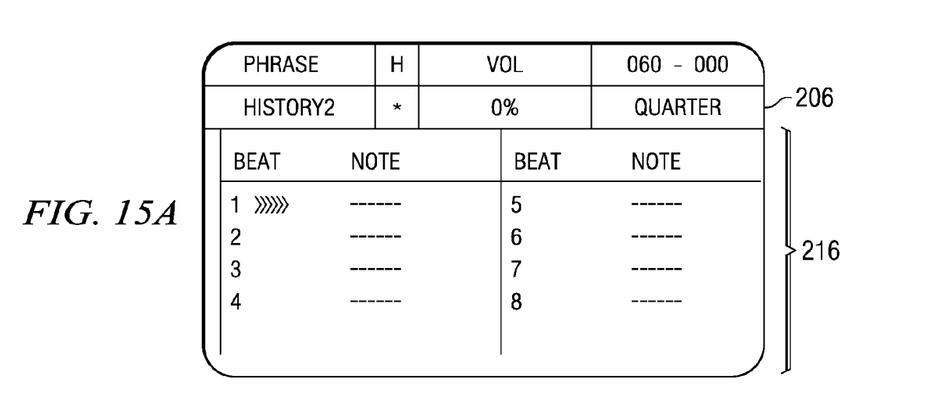
FIGS. 15A-E illustrate a phrase setup process.

FIGS. 15A-E illustrate a phrase setup process. To set up a phrase, the user presses the phrase setup control 234 to cause the display 206 to enter into phrase setup mode as shown in FIG. 15A. The data display 216 displays eight possible note values, although other numbers of displayed note values are possible. When the system 100 executes the phrase, note values of the setup phrase are executed in the order indicated on the phrase setup screen.

Figure 15B:
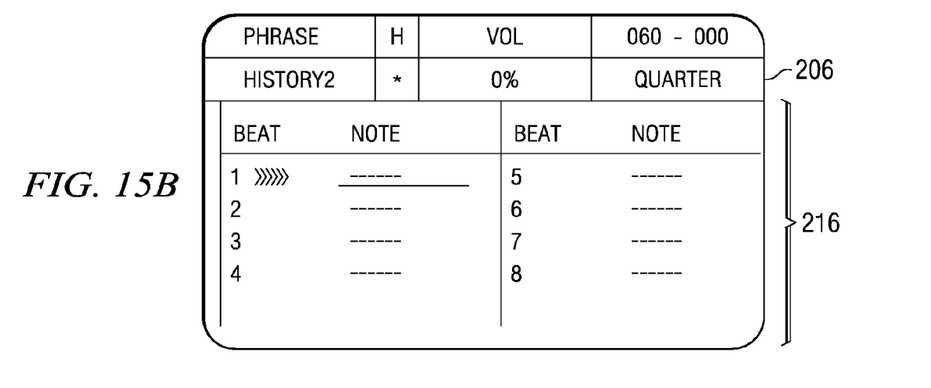

Next, the user rotates the selector 208 until an indicator points to note 1, as shown in FIG. 15A. The user presses the selector 208 to edit a value of a first note (i.e., note 1) of the phrase being set up. A line appears under the note value location to indicate that the value of the selected note (i.e., note 1) is being edited, as shown in FIG. 15B.

Figure 15C:
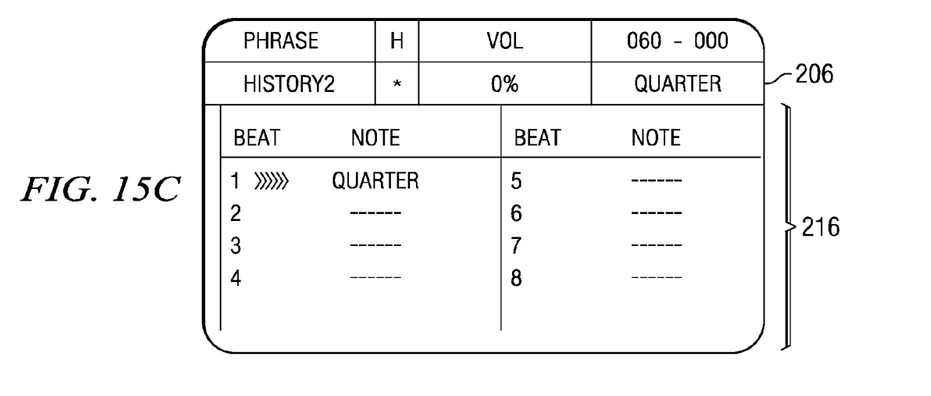

In the illustrative embodiment of FIGS. 15A-E, possible note values that may be selected for any of notes 1-8 are: 1) quarter; 2) eighth; 3) eighth note triplet; 4) sixteenth; 5) 5over1; 6) sixteenth note triplet; 7) 7over1; and 8) thirtysecond. Those having skill in the art will appreciate that other note values may be made available for user selection without departing from principles of the invention. The user may rotate the selector 208 until the desired note value appears in the data display 216 for note 1. When the user is finished editing the note value for note 1, the user may press the selector 208 to discontinue editing note 1. In response to depression of the selector 208, the underscore line disappears and the selected note value (e.g., quarter) remains, as shown in FIG. 15C.

Figure 15D:
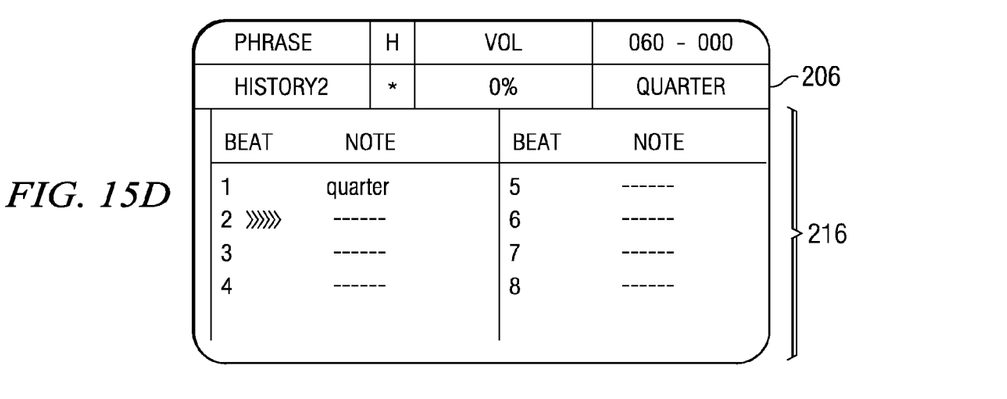

Following selection of the note value for note 1, the user may rotate the selector 208 to position the indicator at the second note (i.e., note 2) of the phrase to be set up, as shown in FIG. 15D. The note setup steps set forth above relative to note 1 are repeated to set up note 2. Notes 3-8 may be set up by the user in similar fashion to that above.

Figure 15E:
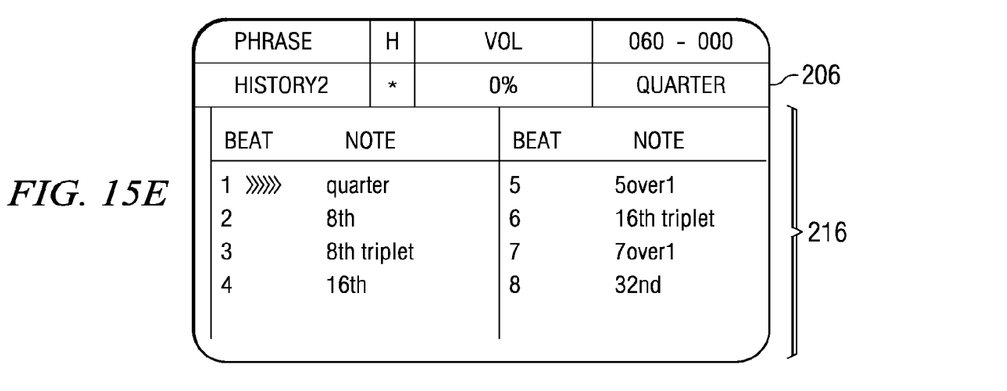

Assuming that all eight notes have been set up by the user, FIG. 15E illustrates a complete phrase set up by the user. Of course, not all eight notes necessarily need be set up. After phrase setup is complete, the user may use the permutations control 232 to set up any desired permutations within the phrase.

Figure 8:
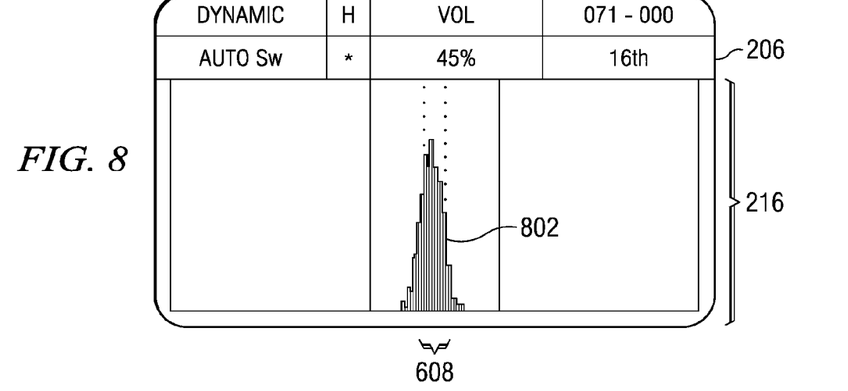
FIG. 8 is a diagram that illustrates the display of the system of FIG. 2 when the system is in Dynamic Analyzer while in Auto-Switch view.

FIG. 8 is a diagram that illustrates the display 206 of the timing-training system 100 when the timing-training system 100 is in Dynamic Analyzer while in Auto-Switch view. When the timing-training system 100 is as such and detects no input, the timing-training system 100 automatically switches to a History view, History1 being illustrated. The History1 view depicts each stroke as a single pixel within the data display 216 to generate a histogram 802. Over the course of a practice session, pixels accumulate from the bottom of the data display 216 upwards in order to provide to the user an at-a-glance picture of the user's cumulative timing tendencies for that practice session. For example, a History1 view that shows the majority of the user's strokes (i.e., pixels) within the click marker 608 means that the user was very accurate. On the other hand, if the History1 view shows several pixels that are before and/or after a click marker 608, as well as some pixels on one or more click marker 608, the user was not as accurate during that practice session.

Figure 9:
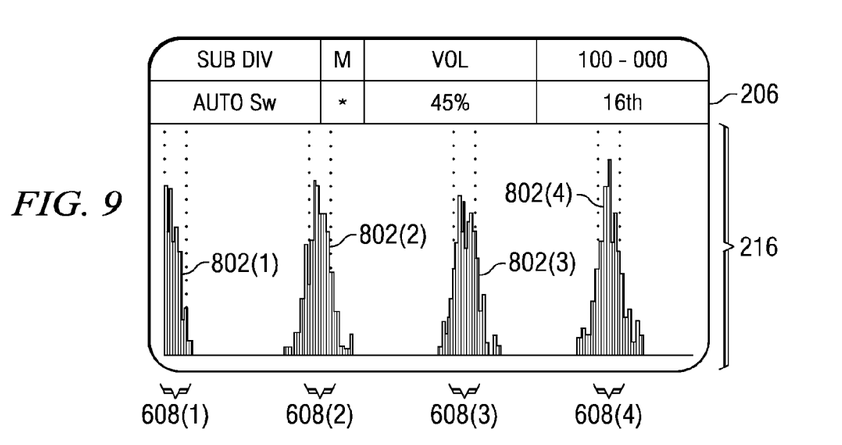
FIG. 9 is a diagram that illustrates the display of the system of FIG. 2 when the system is in History1 view.

FIG. 9 is a diagram that illustrates the display 206 of the timing-training system 100 when the timing-training system 100 is in History1 view after having been used in Subdivision Analyzer. The History1 view shown in FIG. 9 is analogous to that of FIG. 8 in that each stroke is depicted as a single pixel within the data display 216 to generate histograms 802(1)-(4). Over the course of a practice session, pixels accumulate from the bottom of the data display 216 upwards in order to provide to the user an at-a-glance picture of the user's cumulative timing tendencies for that practice session. For example, a History1 view that shows the majority of the user's strokes (i.e., pixels) within the click markers 608(1)-(4) means that the user was very accurate. On the other hand, if the History1 view shows several pixels that are before and/or after one of the click markers 608(1)-(4), as well as some pixels on one or more of the click markers 608(1)-(4), the user was not as accurate during that practice session.

Figure 10:
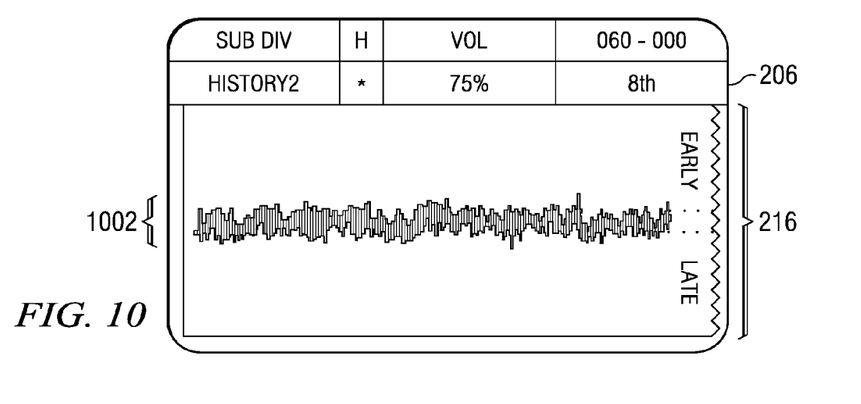
FIG. 10 is a diagram that illustrates the display of the system of FIG. 2 when the system is in History2 view.

FIG. 10 is a diagram that illustrates the display 206 of the timing-training system 100 when the timing-training system 100 is in History2 view. The History2 view features a horizontal click marker 1002 and a scrolling display that represents the most-recent 128 consecutive beats. As shown, the rightmost beat is the most recent one and the leftmost beat is the oldest beat; however, those having skill in the art will appreciate that the direction in which the scrolling display proceeds is a design choice that can be varied without departing from principles of the invention.

New beats "push" the older beats off the left side of the display. The timing-training system 100 represents timing accuracy in the History2 view by placing a stroke indicator higher or lower in the data display 216. In FIG. 10, an early stroke relative to a corresponding metronome click is indicated by a corresponding stroke indicator being placed higher in the data display 216, while, in similar fashion, a late drum strike is placed lower on the data display 216. Those having skill in the art will appreciate that the History2 view could also be used to display user dynamics for example, by placing stroke indicators higher in the data display 216 for hard drum strikes and lower in the data display 216 for soft drum strikes. When all strokes in a beat have been played, the timing-training system 100 "connects the dots" (i.e., individually-displayed stroke indicators) to create a visual representation of the historical performance of that beat.

An Auto-Switch view may be used by the user to automatically switch between the real-time result-view and any one of the history result views, depending upon whether the user is striking the drum pad 202. In the Auto-Switch view, the timing-training system 100 automatically displays a history result-view after it detects no drum pad 202 activity for one complete beat. The timing-training system 100 automatically switches to the real-time result view when the user resumes striking the drum pad 202. The Auto-Switch view provides added convenience by showing practice results as soon as possible without the user needing to manually change views. The timing-training system 100 can be set to default to the History1 result view or the History2 result view by setting Auto-Switch history preferences.

Figure 11:
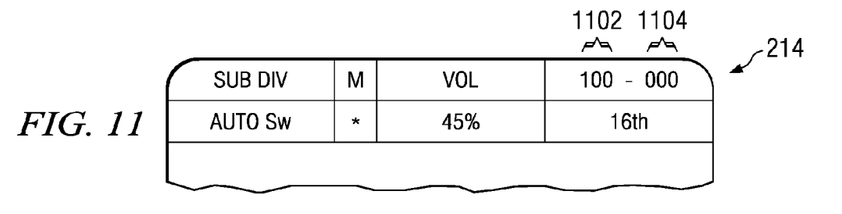
FIG. 11 is a diagram that illustrates a skill level indicator of the current settings display shown in FIG. 3.

FIG. 11 is a diagram that illustrates a skill level indicator of the current settings display 214. Examples of margins of tolerance for the different skill levels are as follows: low-within seven 512th notes; medium-within five 512th notes; high-within three 512th notes; and expert-within one 512th note. The skill level selected by the user can significantly affect the user's score. The low skill level is the most forgiving and typically results in the highest scores. Conversely, the expert level allows a very narrow margin for error, which can result in much lower scores. The user can change the skill level when the timing-training system 100 at any time and observe the change in score. The current settings display 214 indicates the skill level as shown in FIG. 11. The user's score reflects the accuracy of all notes in the rhythmic pattern based on the selected skill level. The score area on the current settings display 214 represents the score as a percentage, a lower percentage indicating less accuracy and a higher percentage indicating more accuracy. During the practice session, the score changes dynamically to indicate the cumulative score for all notes that have been played since last reset.

A set tempo indicator 1102 is the metronome marking that the user sets for the quarter note beat. For example, if the current settings display 214 shows "120," the timing-training system 100 is set to play at 120 quarter-note beats per minute. A measured tempo indicator 1104 is the tempo of the user's strokes as they correspond to a measurement in beats per minute. For example, if the set tempo is 120 and the measured tempo is on or around 130, the strokes are occurring at a faster tempo than the metronome clicks of the timing-training system 100, which means that the user is rushing.

A typical embodiment uses a quarter note as its fundamental beat. A note selection function lets the user select a subdivided note for the quarter note. For example, the user can select a quarter note, 8th-note, 8th-note triplet, 16th-note, five over one, 16th-note triplet, seven over one, and 32nd note. When the user starts a practice session, a subdivided note is generated. Users can create all permutations of a subdivided note by replacing any note, including specific notes within a triplet or 5/1 or 7/1 subdivision, with a rest described in more detail below. For example, in the timing-training system 100, the user can create all permutations of a beat by replacing one or more notes, including, for example, specific notes within a triplet or 5/1 or 7/1 subdivision, with a rest using the permutations control 232.

Permutations may be set, for example, by turning the selector 208 to select a desired subdivision to be turned off and pressing the selector 208 to turn the desired subdivision off. If the subdivision that has been turned off is later desired to be turned on, it may be selected via the selector 208 and the selector 208 pressed again to turn the subdivision back on. When a particular subdivision has been turned off, the metronome does not click that subdivision. Those having skill in the art will appreciate that many different mechanisms may be used in accordance with principles of the invention for setting permutations, such as, for example, a mouse wheel, track ball, slider, or the like. In contrast to various embodiments of the invention, in some previous systems, volume levels of subdivisions were controllable; however, users of these previous systems could not turn on or off any specific subdivisions individually. Instead, in these previous systems, the user could only adjust all subdivisions at once. For instance, a $1/16^{th}$ note slider could be used in the previous systems to control all sixteenth notes or all ⅛ note triplets, but did not permit the users to isolate and control a specific $1/16^{th}$ note or $1/8^{th}$ note triplet.

Figure 12:
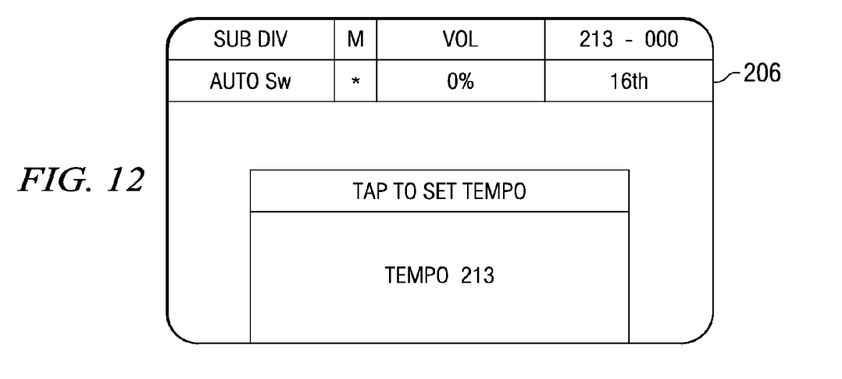
FIG. 12 is a diagram that illustrates the display of the system of FIG. 2 when the system is in tap tempo mode.

FIG. 12 is a diagram that illustrates the display 206 of the timing-training system 100 when the timing-training system 100 is in tap tempo mode. The click/tap control 240 can be used in two different ways. If the practice session is started and running, the click/tap control 240 functions as a click depth control. If the practice session is paused, the click/tap control functions as a tap start control or tap tempo control.

During a practice session, the click/depth control adjusts the depth, (i.e., frequency) of subdivided metronome clicks. For example, if the subdivision is 32nd notes at a quick tempo, the user may want to reduce the clicks to a lower subdivision, such as, for example, 16th notes, 8th notes, or quarter notes. At faster tempos, click depth control can make it easier for the user to distinguish the user's strokes from the audible metronome clicks. Each time the user presses the click/tap control 240, the user reduces the click depth by half until only the quarter note beat sounds. Even if the user reduces the click depth, the timing-training system 100 still scores accuracy based on the selected note subdivision.

The tap control works either as a tap tempo control or a tap start control. The tap tempo control sets the tempo based on strokes on the drum pad, allowing the user to set the tempo by playing and to manually start a practice session later. The tap start control sets the tempo and automatically starts the practice session based on a number of count-off beats that user specifies, allowing the user to start a practice session "on the fly." To use the tap tempo function, with the timing-training system 100 paused, the click/tap control 240 is pressed once and the drum pad is struck at least twice and the resulting tempo viewed. Thereafter, each time the drum pad is stricken, the tempo is updated based upon the most recent user input.

Figure 13:
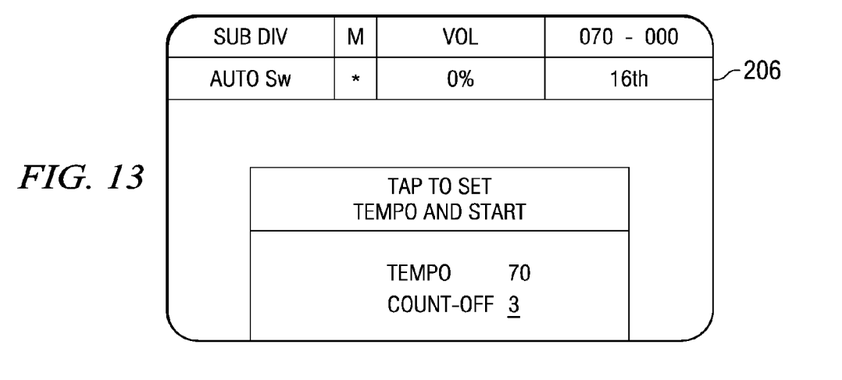
FIG. 13 is a diagram that illustrates the display of the system of FIG. 2 when the system is in tap start mode.

FIG. 13 is a diagram that illustrates the display 206 of the timing-training system 100 when the timing-training system 100 is in tap start mode. To use the tap start function, with the timing-training system 100 paused, the user may press the click/tab control 240 twice, turn the selector to set the desired number of count off beats, strike the set number of count-off beats on the drum pad at the desired tempo, and the timing-training system 100 starts automatically at the count-off beats.

Figure 14:
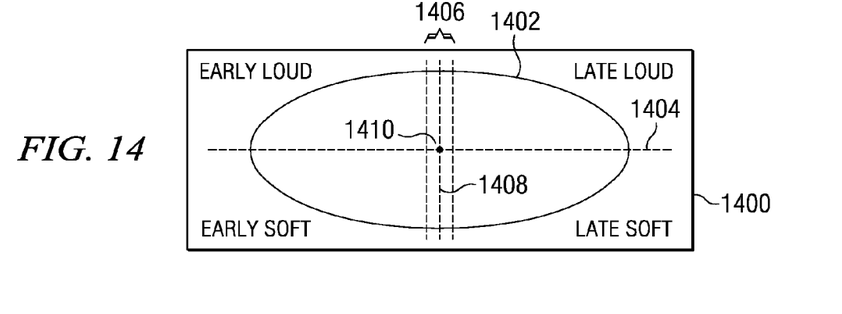
FIG. 14 is illustrates the display of the system of FIG. 2 in a scatter-view.

FIG. 14 is a scatter-view diagram that illustrates the display 206 of the timing-training system 100 when the timing-training system 100 is being used to simultaneously track both the dynamic level (i.e., loudness) and timing of the user. A view 1400 of the display 206 includes a target ellipse 1402, a dynamic-level target line 1404, a click marker 1406, and a timing target line 1408. As will be apparent to those having skill in the art, in the embodiment shown in FIG. 14, the timing rhythmic dynamic analyzer 106 of the timing-training system 100 receives inputs from the user in the form of strikes to the drum pad 202 via the input 110. Each time such an input is detected, the timing rhythmic dynamic analyzer 106 causes a stroke indicator 1410 to appear on the display 206 at a position determined via a display sweep function. As far as the user is concerned, the stroke indicator 1410 appears in real time once the user strikes the drum pad 202. As the user continues a practice session, the display sweep function continues to sweep the data display 216. In the embodiment shown in FIG. 14, the sweep function proceeds from left to right in repetitive fashion throughout the practice session, although those having skill in the art will appreciate that the direction of procession is a design choice.

Placement of the stroke indicator 1410 horizontally and vertically on the view 1400 is determined by the timing rhythmic dynamic analyzer 106. In the illustration shown in FIG. 14, the stroke indicator 1410 is shown as indicating a perfect user strike, which results in the stroke indicator 1410 being placed at the intersection of the target line 1404 and the timing target line 1408. If, however, the user were to perform a strike that is both late and loud relative to a metronome click and a target dynamic level, respectively, the stroke indicator 1410 would be placed in the upper right quadrant of the view 1400 in, for example, the vicinity of the upper right quadrant of the view 1400. In similar fashion, a late and soft strike would result in the stroke indicator 1410 being located in the lower right quadrant of the view 1400, while an early and soft strike would cause the stroke indicator 1410 to be located in the lower left quadrant and an early and loud strike would cause the stroke indicator 1410 to be located in the upper left quadrant of the view.

Those having skill in the art will appreciate that although various embodiments of the invention have been described in the context of a drummer striving to improve his or her timing skills, various embodiments of the invention may be used by users playing other instruments besides the drums without departing from principles of the invention. For example, input may be provided to embodiments of the invention via a microphone, vibration sensor, or direct electrical coupling such as that from an electric guitar or other instrument equipment with a pickup system. Moreover, various embodiments of the invention may be used in other areas of endeavor unrelated to training of musicians in which improving timing skills is desired without departing from principles of the invention. In addition, although one or more click markers is shown and described herein, in various embodiments of the invention, a click marker need not be necessarily present on the display during a practice session. However, in a typical embodiment, the click marker(s) serve as a visual target for the user to assess how close the timing of the user is to the metronome clicks being generated by the timing-training system 100.

Embodiments of the present invention may be implemented in, for example, hardware, software (e.g., carried out by a processor that executes computer-readable instructions), or a combination thereof. The computer-readable instructions may be program code loaded in a memory such as, for example, Random Access Memory (RAM), or from a storage medium such as, for example, Read Only Memory (ROM). For example, a processor may be operative to execute software adapted to perform a series of steps in accordance with principles of the present invention. The software may be adapted to reside upon a computer-readable medium such as, for example, a magnetic disc within a disc drive unit. The computer-readable medium may also include a flash memory card, EEROM based memory, bubble memory storage, ROM storage, etc. The software adapted to perform according to principles of the present invention may also reside, in whole or in part, in static or dynamic main memories or in firmware within a processor (e.g., within microcontroller, microprocessor, or a microcomputer internal memory).

Although various embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A system for timing training comprising:
a display system operable to display, via a sweep function, a real-time visual indicator responsive to user input;
a user input device interoperably connected to the display system; and
a metronome device synchronized with the sweep function such that a position of a displayed real-time visual indicator is indicative of an amount of time between a user input and a sound generated by the metronome device.

2. The system for timing training of claim 1, wherein the display system displays a marker template operable to indicate user input timing relative to the sound generated by the metronome device.

3. The system for timing training of claim 2, wherein the marker template comprises a single marker indicating a position of the sweep function corresponding to the sound generated by the metronome device.

4. The system for timing training of claim 2, wherein a tolerance region of the marker template may be adjusted according to a selected user skill level.

5. The system for timing training of claim 2, wherein the marker template comprises at least one pair of spaced-apart markers indicating a tolerance region bounding a position of the sweep function corresponding to the sound generated by the metronome device.

6. The system for timing training of claim 5, wherein the at least one pair of spaced-apart markers extends perpendicularly relative to a direction of the sweep function.

7. The system for timing training of claim 5, wherein the at least one pair of spaced-apart markers extends parallel to a direction of the sweep function.

8. The system for timing training of claim 2, wherein the marker template comprises a plurality of pairs of spaced-apart markers indicating a plurality of tolerance regions bounding positions of the sweep function corresponding to sounds generated by the metronome device.

9. The system for timing training of claim 5, wherein the tolerance region may be adjusted according to a selected user skill level.

10. The system for timing training of claim 1, wherein the real-time visual indicator comprises a vertical line placed on the display at a position of the sweep function responsive to detection of the user input.

11. The system for timing training of claim 1, wherein the real-time visual indicator comprises a horizontal line placed on the display at a position of the sweep function responsive to detection of the user input.

12. The system for timing training of claim 1, wherein the real-time visual indicator is operable to indicate a dynamic level of the user input.

13. The system for timing training of claim 1, wherein the user input device comprises a transducer and a drum device selected from the group consisting of a drum pad and an acoustic drum.

14. The system for timing training of claim 1, wherein the user input device comprises a transducer interoperably connected to at least one non-drum musical instrument.

15. The system for timing training of claim 1, wherein the display system is operable to display user results comprising at least one histogram of historical user inputs.

16. The system for timing training of claim 15, wherein the at least one histogram is displayed relative to a marker template operable to indicate user input timing relative to sounds generated by the metronome device.

17. The system for timing training of claim 16, wherein the at least one histogram is formed by displaying a single pixel for each user input during a practice session.

18. The system for timing training of claim 15, wherein the at least one histogram grows perpendicularly relative to a direction of the sweep function as a user's practice session proceeds.

19. The system for timing training of claim 1, wherein:
the display system is operable to display a plurality of user inputs along a horizontal time axis;
a user input occurring earlier than a corresponding audible sound generated by the metronome device is displaced vertically from an axis in a first direction; and
a user input occurring later than a corresponding audible sound generated by the metronome device is displaced vertically from the axis in a second direction.

20. The system for timing training of claim 1, wherein the system is operable to display historical user inputs responsive to detection of no user input for a predetermined time.

21. The system for timing training of claim 1, wherein:
the metronome device is operable to permit note selection and permutations control;
the permutations control permits a user to replace subdivided notes with rests to create a variety of rhythmic variations of a main beat; and
the note selection permits the user to select a subdivided note.

22. The system for timing training of claim 1, wherein the system is operable to generate a score based on historical user inputs.

23. The system for timing training of claim 4, wherein the system is operable to generate a score based on historical user inputs and the selected user skill level.

24. The system for timing training of claim 1, wherein:
a metronome-device click depth may be adjusted by the user; and
the metronome-device click depth is a measure of subdivided audible metronome-device clicks.

25. The system for timing training of claim 1, wherein the system is operable to be staffed by a user via user input to the user input device.

26. The system for timing training of claim 1, wherein the system for timing training is operable to cycle among a plurality of display views independently of the occurrence of user input.

27. A timing-training method comprising:
generating, via a metronome device, a plurality of sounds, the plurality of generated sounds synchronized with a sweep function;
displaying, via the sweep function, a real-time visual indicator responsive to user input such that a position of the displayed real-time visual indicator is indicative of an amount of time between the user input and a sound of the plurality of generated sounds.

28. The timing-training method of claim 27, wherein the step of displaying comprises displaying a marker template operable to indicate user input timing relative to the plurality of generated sounds.

29. The timing-training method of claim 28, wherein the marker template comprises a single marker indicating a position of the sweep function corresponding to a generated sound.

30. The timing-training method of claim 28, further comprising adjusting a tolerance region of the marker template according to a selected user skill level.

31. The timing-training method of claim 28, wherein the marker template comprises at least one pair of spaced-apart markers indicating a tolerance region bounding a position of the sweep function corresponding to a generated sound.

32. The timing-training method of claim 31, wherein the at least one pair of spaced-apart markers extends perpendicularly relative to a direction of the sweep function.

33. The timing-training method of claim 31, wherein the at least one pair of spaced-apart markers extends parallel to a direction of the sweep function.

34. The timing-training method of claim 28, wherein the marker template comprises a plurality of pairs of spaced-apart markers indicating a plurality of tolerance regions bounding positions of the sweep function corresponding to generated sounds.

35. The timing-training method of claim 31, further comprising adjusting the tolerance region according to a selected user skill level.

36. The timing-training method of claim 27, wherein the real-time visual indicator comprises a vertical line placed on a display at a position of the sweep function responsive to detection of the user input.

37. The timing-training method of claim 27, wherein the real-time visual indicator comprises a horizontal line placed on a display at a position of the sweep function responsive to detection of the user input.

38. The timing-training method of claim 27, further comprising the real-time visual indicator indicating a dynamic level of the user input.

39. The timing-training method of claim 27, further comprising receiving the user input via a drum pad interoperably coupled to a transducer.

40. The timing-training method of claim 27, further comprising receiving the user input via at least one non-drum musical instrument.

41. The timing-training method of claim 27, further comprising displaying user results comprising at least one histogram of historical user inputs.

42. The timing-training method of claim 41, wherein the step of displaying user results comprises displaying at least one histogram relative to a marker template operable to indicate user input timing relative to the generated sounds.

43. The timing-training method of claim 42, further comprising forming the at least one histogram by displaying a single pixel for each user input during a practice session.

44. The timing-training method of claim 41, further comprising the at least one histogram growing perpendicularly relative to a direction of the sweep function as a user's practice session proceeds.

45. The timing-training method of claim 27, wherein:
the step of displaying comprises displaying a plurality of user inputs along a horizontal time axis;
displacing vertically from the axis in a first direction a user input occurring earlier than a corresponding generated sound; and
displacing vertically from the axis in a second direction a user input occurring later than a corresponding generated sound.

46. The timing-training method of claim 27, further comprising displaying historical user inputs responsive to detection of no user input for a predetermined time.

47. The timing-training method of claim 27, further comprising receiving user-input note selection and permutations control;
wherein the permutations control permits a user to replace subdivided notes with rests to create a variety of rhythmic variations of a main beat; and
wherein the note selection permits the user to select a subdivided note.

48. The timing-training method of claim 27, further comprising generating a score based on historical user inputs.

49. The timing-training method of claim 30, further comprising generating a score based on historical user inputs and the selected user skill level.

50. The timing-training method of claim 27, further comprising receiving a metronome-device click depth from the user; and
wherein the metronome-device click depth is a measure of subdivided audible metronome-device clicks.

51. The timing-training method of claim 27, comprising initiating the displaying step by a user via the user input.

52. The timing-training method of claim 27, further comprising cycling among a plurality of display views independently of the occurrence of user input.

53. A note-phrase setup method comprising:
selecting a first note value of a plurality of available note values playable by a timing-training system;
selecting a second note value of the plurality of available note values; and
playing the selected notes as a note phrase.

54. The note-phrase setup method of claim 53, wherein the plurality of available notes comprise at least two of the following:
quarter;
eighth;
eighth note triplet;
sixteenth;
5over1;
sixteenth note triplet;
7over1; and
thirtysecond.

55. The note-setup method of claim 53, wherein the step of playing comprises playing the selected notes in numerical order.

56. The note setup method of claim 55, further comprising repeating the step of playing until a user input to stop.

57. The note setup method of claim 53, further comprising setting a plurality of desired note-phrase permutations.

* * * * *

UNITED STATES PATENT AND TRADEMARK OFFICE
CERTIFICATE OF CORRECTION

| | | |
|---|---|---|
| PATENT NO. | : 7,557,287 B2 | Page 1 of 1 |
| APPLICATION NO. | : 11/536446 | |
| DATED | : July 7, 2009 | |
| INVENTOR(S) | : Mark L. Wilson et al. | |

It is certified that error appears in the above-identified patent and that said Letters Patent is hereby corrected as shown below:

Title Page, Item (56), In References Cited insert Other Publications:
--Non Patent Literature Document "Russian Dragon: Model RD-R"; http://www.russiandragon.com/RDR.HTM, 2 pages, 03/16/2001--

In Reference Cited:
--Non Patent Literature Document "Russian Dragon: Model RD-T"; http://www.russiandragon.com/RDT.HTM, 2 pages, 03/16/2001--

In Column 16, Claim 25, Line 10
Replace --staffed-- with "started"

Signed and Sealed this

First Day of December, 2009

David J. Kappos
*Director of the United States Patent and Trademark Office*